(12) United States Patent
Gallo et al.

(10) Patent No.: US 11,579,388 B2
(45) Date of Patent: Feb. 14, 2023

(54) OPTICAL FIBER CABLE WITH IMPROVED FIRE PROTECTION PERFORMANCE

(71) Applicant: CORNING RESEARCH & DEVELOPMENT CORPORATION, Corning, NY (US)

(72) Inventors: Emanuela Gallo, Berlin (DE); Michael Alexander Heinz, Berlin (DE); Tomasz Kazmierczak, Lodz (PL); Kirsten Langfeld, Berlin (DE)

(73) Assignee: CORNING RESEARCH & DEVELOPMENT CORPORATION, Corning, NY (US)

( * ) Notice: Subject to any disclaimer, the term of this patent is extended or adjusted under 35 U.S.C. 154(b) by 0 days.

(21) Appl. No.: 17/570,850

(22) Filed: Jan. 7, 2022

(65) Prior Publication Data

US 2022/0128784 A1    Apr. 28, 2022

Related U.S. Application Data

(63) Continuation of application No. 17/014,196, filed on Sep. 8, 2020, now Pat. No. 11,237,347, which is a
(Continued)

(30) Foreign Application Priority Data

Mar. 12, 2018  (EP) ..................................... 18161229

(51) Int. Cl.
*G02B 6/44* (2006.01)

(52) U.S. Cl.
CPC ........... *G02B 6/4436* (2013.01); *G02B 6/443* (2013.01)

(58) Field of Classification Search
CPC .............................. G02B 6/443; G02B 6/4436
See application file for complete search history.

(56) References Cited

U.S. PATENT DOCUMENTS

| | | |
|---|---|---|
| 5,356,710 A | 10/1994 | Rinehart |
| 5,841,072 A | 11/1998 | Gagnon |

(Continued)

FOREIGN PATENT DOCUMENTS

| | | |
|---|---|---|
| CN | 200986605 Y | 12/2007 |
| CN | 103116203 A | 5/2013 |

(Continued)

OTHER PUBLICATIONS

Baoshu et al., "The multilayered distribution of intumescent flame retardant and its influence on a fire and mechanical properties of PP", Composites Science and Technology, vol. 93, 2014, pp. 54-60.
European Patent Application No. 18161229.2 European Search Report and Search Opinion dated Sep. 18, 2018; 8 Pages; European Patent Office.
(Continued)

*Primary Examiner* — Ryan A Lepisto
(74) *Attorney, Agent, or Firm* — William D. Doyle

(57) ABSTRACT

An optical fiber cable comprises a cable core including at least one optical transmission element to transfer light, and a cable jacket surrounding the cable core. The cable jacket is embodied as a multilayered structure having a first sheath layer and at least a second sheath layer being surrounded by the first sheath layer. The material of the first and the second sheath layer is halogen free. The material of the first sheath layer and the material of the second sheath layer have a different flame retardant additive providing different flame retardant mechanisms.

11 Claims, 6 Drawing Sheets

Related U.S. Application Data continuation of application No. PCT/US2019/021331, filed on Mar. 8, 2019.

(56) References Cited

U.S. PATENT DOCUMENTS

| | | | |
|---|---|---|---|
| 5,912,436 | A | 6/1999 | Sanchez et al. |
| 6,114,036 | A | 9/2000 | Rinehart et al. |
| 6,441,308 | B1* | 8/2002 | Gagnon .................. H01B 7/295 |
| | | | 174/105 R |
| 10,222,547 | B2* | 3/2019 | Chen .................... C03C 25/1065 |
| 10,428,209 | B2* | 10/2019 | Jiang ...................... H01B 7/295 |
| 10,640,634 | B2* | 5/2020 | Kohri ..................... C08K 5/098 |
| 2005/0045368 | A1 | 3/2005 | Keogh |
| 2015/0131952 | A1 | 5/2015 | Gallo et al. |
| 2015/0268430 | A1 | 9/2015 | Bringuier et al. |
| 2016/0306129 | A1 | 10/2016 | Hurley et al. |
| 2017/0153405 | A1* | 6/2017 | Bringuier ............. G02B 6/4433 |
| 2020/0087199 | A1* | 3/2020 | Gimblet ................ C03C 25/143 |
| 2020/0088967 | A1* | 3/2020 | Bookbinder ......... G02B 6/4434 |

FOREIGN PATENT DOCUMENTS

| | | |
|---|---|---|
| CN | 203377015 U | 1/2014 |
| CN | 106057347 A | 10/2016 |
| CN | 106519421 A | 3/2017 |
| EP | 3106907 A1 | 12/2016 |
| EP | 3270201 A1 | 1/2018 |
| JP | 2010-061885 A | 3/2010 |
| JP | 5330660 B2 | 10/2013 |

OTHER PUBLICATIONS

European Patent Application No. 18161229.2 Communication pursuant to Article 94(3) EPC dated Aug. 6, 2020; 11 Pages; European Patent Office.

Gallo et al., "Tailoring the flame retardant and mechanical performances of natural fiber-reinforced biopolymer by multicomponent laminate", Composites Part B: Engineering, vol. 44, 2013, pp. 112-119.

International Search Report and Written Opinion of the International Searching Authority; PCT/US2019/021331; dated May 31, 2019; 12 Pages; European Patent Office.

Jichun et al., "A preliminary study on the thermal degradation behavior and flame retardancy of HIPS/MH/MRP composite with a gradient structure", Polymer Degradation and Stability, vol. 105, 2014, pp. 21-30.

Laachachi et al., "Diffusion of Polyphosphates into (Poly(allyamine)-montmorillonite) Multilayer Films: Flame Retardant-Intumescent films with Improved Oxygen Barrier", Langmuir, vol. 27(22), 2011, pp. 13879-13887.

Viretto et al., "Selective dispersion of nanoplatelets of MDH in a HDPE/PBT binary blend: Effect on flame retadancy", Polymer Degradation and Stability, vol. 126, 2016, pp. 107-116.

Zhuoli et al., "Thermo-oxidative degradation behavior and fire performance of HIPS/MH/MRP composite with and alternating layered structure", Polymer Degradation and Stability, vol. 115, 2015, pp. 54-62.

European Patent Application No. 18161229.2 Communication pursuant to Article 94(3) EPC dated Sep. 27, 2022; 9 Pages; European Patent Office.

* cited by examiner

OPTICAL FIBER CABLE WITH IMPROVED FIRE PROTECTION PERFORMANCE

PRIORITY APPLICATION

This application is a continuation of U.S. patent application Ser. No. 17/014,196, filed Sep. 8, 2020, which is a continuation of International Application No. PCT/US2019/021331, filed on Mar. 8, 2019, which claims the benefit of priority to EP Patent Application No. 18161229.2, filed on Mar. 12, 2018, each application being incorporated herein by reference.

BACKGROUND

The disclosure relates to an optical fiber with an effective fire protection.

Communication networks are used to transport a variety of signals such as voice, video, data transmission, and the like. Traditional communication networks use copper wires in cables for transporting information and data. However, copper cables have drawbacks because they are large, heavy, and can only transmit a relatively limited amount of data. On the other hand, an optical waveguide is capable of transmitting an extremely large amount of bandwidth compared with a copper conductor. Moreover, an optical waveguide cable is much lighter and smaller compared with a copper cable having the same bandwidth capacity.

Consequently, optical waveguide cables replaced most of the copper cables in long-haul communication network links, thereby providing greater bandwidth capacity for long-haul links. However, many of these long-haul links have bandwidth capacity that is not being used. This is due in part to communication networks that use copper cables for distribution and/or drop links on the subscriber side of the central office. In other words, subscribers have a limited amount of available bandwidth due to the constraints of copper cables in the communication network. Stated another way, the copper cables are a bottleneck that inhibit the subscriber from utilizing the relatively high-bandwidth capacity of the long-hauls links.

As optical waveguides are deployed deeper into communication networks, subscribers will have access to increased bandwidth. But there are certain obstacles that make it challenging and/or expensive to route optical waveguides/optical cables deeper into the communication network, i.e., closer to the subscriber. Optical cables are mainly provided with inflammable plastic materials that easily propagate and transfer the fire from a source of the fire to other areas within a building.

The European Construction Regulation (CPR) which became operational in 2016 regulates the fire and smoke behaviour of permanently installed indoor cables within the European market. In order to fulfil the new CPR requirements, high performing materials with low smoke and heat release are needed in indoor cable designs. The traditional cable materials need to be replaced with high performing halogen-free flame-retardant options. However, the change of the manufacturing steps to replace the traditional cable materials with a high performance flame-retardant material could be very costly and complex, especially when the whole cable design needs to be changed in the cable development process.

There is a need to provide an optical fiber cable that has excellent fire protection properties and can be manufactured without complex manufacturing steps.

SUMMARY

An embodiment of an optical fiber cable with improved cable fiber performance may be manufactured with traditional extrusion methods.

An embodiment of an optical fiber cable with improved fire protection performance comprises a cable core including at least one optical transmission element to transfer light, and a cable jacket surrounding the cable core. The cable jacket is embodied as a multilayered structure having a first sheath layer and at least a second sheath layer being surrounded by the first sheath layer. The material of the first sheath layer and the material of the second sheath layer are halogen-free. The material of the first sheath layer and the material of the second sheath layer have a different flame-retardant additive providing different flame-retardant mechanisms.

Nowadays materials providing a high fire protection performance are available on the market. The inventors found that the use of one single material layer for a cable jacket of an optical fiber cable is in most cases still not enough to protect the optical cable in an efficient way against cable fire and prevent the fire from propagating along the cable. The proposed optical fiber cable design uses several materials assembled as a multilayer in a cable jacket of an optical cable. The inventors found that the combination of two or more layers of flame-retardant materials, possibly also having a different mode of action regarding fire protection mechanisms, for example intumescent-acting materials or materials forming a charring layer in case of a fire, enables to achieve higher fire protection performance of an optical cable than a single material layer used for the cable jacket.

The optical fiber cable has a multilayered jacket made of two or more layers of flame-retardant materials to be used as an outer sheath of the optical fiber cable. In particular, the multilayered embodiment of the cable jacket may be used in indoor cable applications. The multilayered structure of the cable jacket gives 100% halogen-free, non-corrosive, high flame retardant protection. The two or more different materials are assembled in a multilayered thin sheath of the optical cable comprising different flame-retardant additives and mechanisms. The different flame-retardant additives included in a base material of the various layers of the cable jacket may include intumescent-acting materials, mineral fillers, phosphorous and/or nitrogen gas phase active materials, materials to provide an inorganic barrier protection or other highly filled materials.

The multilayered cable jacket has the advantage of tailoring the fire protection performance of the different material layers and thus the fire protection properties of the whole cable by selecting an appropriate base resin material and flame-retardant mechanism.

Moreover, different flame-retardant mechanisms may be combined in one layer of material or in different layers of the multilayered cable jacket. The effectiveness of the fire protection system of the optical cable can be tailored by changing or varying the thickness of each layer of the cable jacket and/or the concentration of the flame-retardant additives in the compound used for the various layers. The optical fiber cable comprising the multilayered structure of the cable jacket shows significantly improved fire protection performances, wherein the use of toxic products, solvents or additives is avoided.

The different layers of the cable jacket may be easily applied on the cable core without changing the inner cable structure. In particular, the multilayered cable jacket may be prepared and processed with traditional extrusion methods.

The different layers of the cable jacket, each with a different flame-retardant mechanism can, for example, be co-extruded in one step or in several steps on the cable core of the optical fiber cable, for example an indoor cable design. According to an alternative manufacturing method, a tandem extrusion process may be used to prepare the multilayered structure of the cable jacket.

Additional features and advantages are set forth in the detailed description that follows and in part will be readily apparent to those skilled in the art from the description or recognized by practising the embodiments as described in the written description and claims hereof, as well as the appended drawings. It is to be understood that both the foregoing general description and the following detailed description are merely exemplary and are intended to provide an overview or framework to understand the nature and character of the claims.

BRIEF DESCRIPTION OF THE DRAWINGS

The accompanying drawings are included to provide further understanding and are incorporated in and constitute a part of the specification. The drawings illustrate one or more embodiments, and together with the detailed description serve to explain principles and operation of the various embodiments. As such, the disclosure will become more fully understood from the following detailed description, taken in conjunction with the accompanying figures in which.

DETAILED DESCRIPTION

Reference is now made in detail to various embodiments of an optical fiber cable, examples of which are partly illustrated in the accompanying drawings. Whenever possible, the same or like reference numbers and symbols are used throughout the drawings to refer to the same or like parts. The drawings are not necessary to scale, and one skilled in the art will recognize where the drawings have been simplified to illustrate the key aspects of the disclosure. The claims as set forth below are incorporated into and constitute part of this detailed description.

Figure 1:
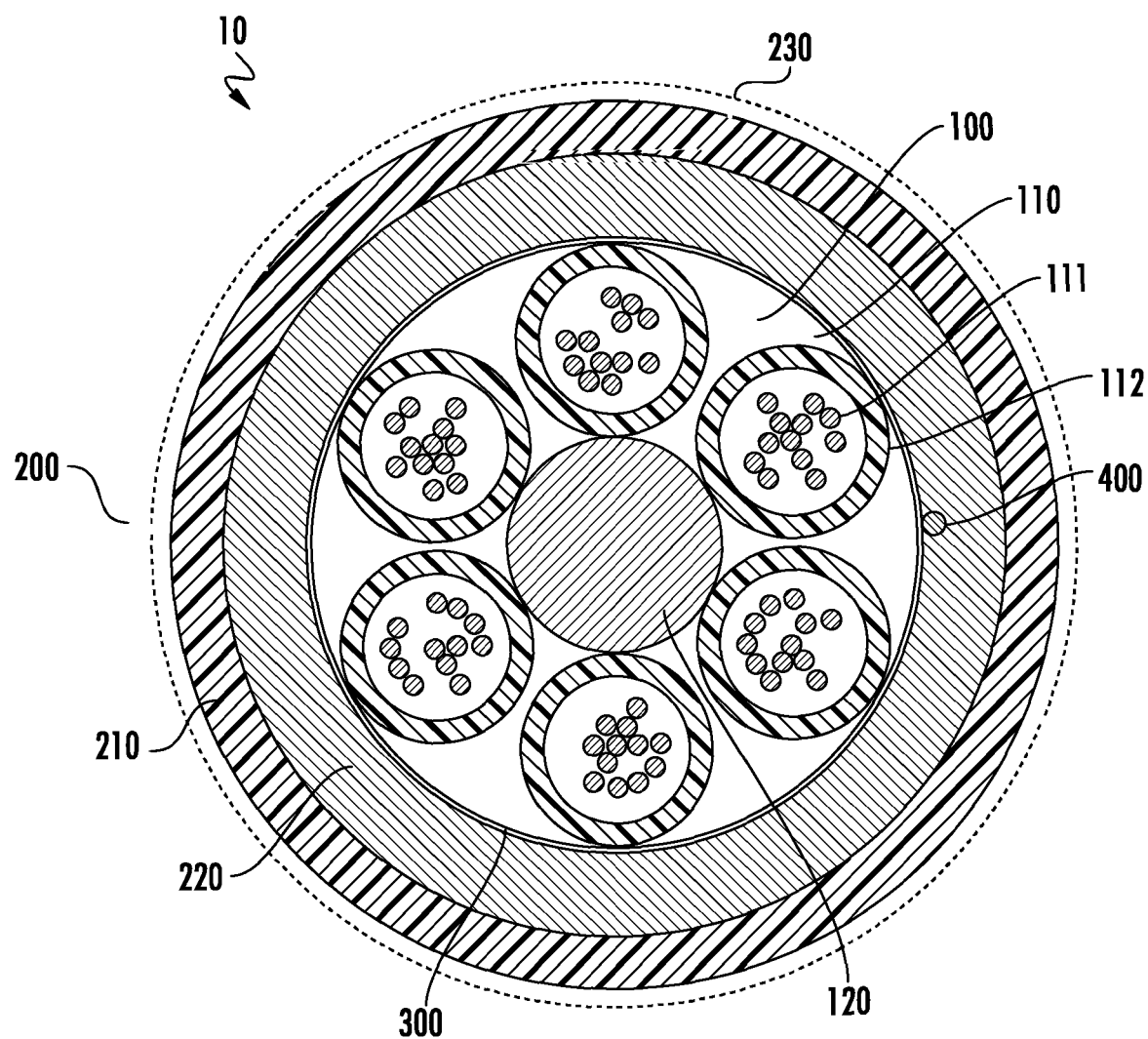
FIG. 1 shows a first embodiment of an optical fiber cable having a multilayered (bi-layered) structure of a cable jacket.

FIG. 1 shows an embodiment of an optical fiber cable 10 having a high fire protection performance. The optical fiber cable 10 may be used as an indoor optical fiber cable.

The optical fiber cable 10 comprises a cable core 100 including at least one optical transmission element 110 to transfer light. The optical cable further comprises a cable jacket 200 surrounding the cable core 100. The cable jacket 200 is embodied as a multilayered structure having a sheath layer 210 and a sheath layer 220. The sheath layer 220 is surrounded by the sheath layer 210. The material of the sheath layer 210 and the material of the sheath layer 220 is halogen-free. The material of the sheath layer 210 and the material of the sheath layer 220 have a different flame-retardant additive providing different flame-retardant mechanisms. Ripcords 400 in or adjoining the jacket 200 may be provided to facilitate opening the jacket.

The cable core 100 may comprise a plurality of the at least one optical transmission element 110 and a strength member 120. Each of the optical transmission elements 110 includes a plurality of optical fibers 111. The optical transmission elements 110 further comprise a respective buffer tube 120 which surrounds the plurality of the optical fibers 111. The optical transmission elements 110 are placed around the strength member 120. The strength member 120 may be configured as a dielectric strength member, for example an up jacketed glass-reinforced composite rod. In other embodiments, the strength member 120 may be, or may include, a steel rod, a stranded steel, tensile yarn or fibers, for example bundled aramid, or other strengthening materials.

The optical transmission elements 110 may be stranded around the strength member 120 in a pattern of stranding including reversals in lay direction of the optical transmission elements. The optical transmission elements 110 may be stranded in a repeating reverse-oscillatory pattern, such as so-called SZ stranding or other stranding patterns, for example helical. In other contemplated embodiments, the optical transmission elements 110 may be non-stranded. The optical transmission element are bound together around the strength member 120 by a film or binder 300.

The cable jacket 200 may optionally comprise a layer 230 which is disposed on the first sheath layer 210 to facilitate a blowing-in process of the optical fiber cable 10 in an empty duct. The layer 230 may be the outermost layer of the cable jacket. The layer 230 may include an antistatic agent to reduce friction between the cable jacket and the duct into which the cable is blown, thereby enhancing blowability.

The cable comprises a halogen-free multi-component layered structured material to be used as a jacketing application. The multilayered cable jacket 200 may be applied onto the cable core 100 by an extrusion process, for example a co-extrusion process or a tandem extrusion process. To limit the process complexity, the number of layers of the cable jacket 200 may be limited to two to three. However, providing the cable jacket 200 with a larger number of layers is possible.

According to a possible embodiment of the optical fiber cable, the material of the sheath layer 220 may include a first flame-retardant additive of at least one of an intumescent-acting material and a filler material and a gas-phase active material and a condensed-phase active material. The material of the at least one second sheath layer 220 may include a second flame-retardant additive of at least another one of the intumescent-acting material and the mineral filler and the gas-phase active material and the condensed-phase active material.

The condensed-phase active material may be configured to provide an inorganic barrier protection for the cable in the case of a cable fire. The condensed-phase active material may induce some char or residue formation. Possible materials for the condensed-phase active material are clay, nanocomposite, inorganic fillers, siloxane or combinations thereof.

The gas-phase active material may be a phosphorous and/or nitrogen-based material. The main mechanism of flame retardation in the gas phase involves inert gas dilution and chemical quenching of active radicals. The dilution effect refers to the release of non-combustible vapors during combustion, diluting the oxygen supply to the flame or diluting the fuel concentration to below the flammability limit.

The material of the first sheath layer 210 may include a mixture of a polymer-based resin and a polymer-filler coupling system and processing additives and the first flame-retardant additive. The material of the at least one second sheath layer 220 may include a mixture of a polymer-based resin and a polymer-filler coupling system and processing additives and the second flame-retardant additive.

The flame-retardant system may either be a system based on a (hydrated) mineral filler, for example a metal hydrate filler and/or a metal hydroxide filler and/or a metal oxide hydroxide filler and/or combinations thereof, or an intumescent system. According to a possible embodiment of the optical fiber cable 10, the first flame-retardant additive in the first sheath layer 210 may include the intumescent-acting material. According to a possible embodiment, the density of the intumescent-acting material is lower than 1.2 g/cm3. The second flame-retardant additive may be included in the second sheath layer 220 and may include the mineral filler. The density of the mineral-based flame-retardant compound can be above 1.3 g/cm3 due to the filler. According to a possible embodiment of the optical fiber cable 10, a loading of the mineral filler in the material mixture of the second sheath layer 220 is between 40 and 65 wt %.

The intumescent-acting material may include a phosphorous-nitrogen combination or ammonium polyphosphate (APP) or intumescent graphite or triazine or combinations thereof. Aluminium-tri-hydroxide (ATH) or magnesium-di-hydroxide (MDH) may be used as possible metal hydrate filler materials or metal hydroxide filler materials. Boehmite (AMH) may be used a possible metal hydroxide filler material. Metal oxide hydroxide filler materials decompose at higher temperature compared to the corresponding hydroxides. Thus, by using metal hydroxides and/or metal oxide hydroxide, the decomposition temperature of the mineral filler can be controlled.

In addition, the intumescent-acting material and/or the mineral filler may include at least one synergist. Examples are zinc borate, bromide, siloxanes, nanoclays or POS. The synergists can be used to further improve the fire protection performance of the optical cable.

According to a possible embodiment of the optical fiber cable 10, the polymer-based resin may be configured as a mixture of polyolefins and polyolefin-based copolymers. The polyolefins may include low-density polyethylene (LDPE) or linear low-density polyethylene (LLDPE). The polyolefin-based copolymer may include ethylene-vinyl acetate (EVA) or ethylene-butyl acetate (EBA) or ethylene-methacrylic acid (EMA) or octane branched polyolefins or butane branched polyolefins.

According to a possible embodiment of the optical fiber cable 10, the polymer-filler coupling system may include grafted polymers, like low-density polyethylene (LDPE), ethylene-vinyl acetate (EVA), etc., with at least one of maleic-acid-anhydride and a maleic-acid-terpolymer and silane-peroxide grafting.

According to a further embodiment of the optical fiber cable 10, the processing additives are lubricants like metal soaps, fatty acids or siloxane-based organics.

According to a further embodiment of the optical fiber cable 10, the first sheath layer 210 and the at least one second sheath layer 220 may respectively include stabilizers for heat aging and UV radiation. Stabilization for heat aging and UV radiation may be realized by phenolic or phosphorous based antioxidants and hindered amine light stabilizers (HALS).

According to a possible embodiment, the first sheath layer 210 is the outermost layer of the jacket 200. The second sheath layer 220 may be a layer which directly surrounds the core section 100, for example the buffer tubes 112 of the optical transmission elements 110. In any case, the second sheath layer 220 is arranged closer to the cable core 100 than the first sheath layer 210.

The intumescent-acting material is preferably included in the first sheath layer 210, i.e. the outer sheath layer on top of the multilayered structure of the cable jacket 200, in order to efficiently react in the case of a cable fire by quickly forming an insulating barrier, protecting the cable from the fire and delaying the combustion process of the underlying materials and sheaths.

The number and thickness of each single layer of the multilayered cable jacket 200 can be varied according to the performances that need to be achieved. According to a possible embodiment of the optical fiber cable 10, the first, outer sheath layer 210 has a thickness of between 0.2 to 0.4 mm. The second sheath layer 220 may have a thickness of between 0.8 to 1 mm.

According to a possible embodiment of the optical fiber cable 10, the material mixture of the first sheath layer 210 may include a polypropylene-copolymer based material and the intumescent-acting material. The material mixture of the second sheath layer 220 may include a polymer combination of equal ratios of ethylene-vinyl acetate and octane branched linear low-density polyethylene and low-density polyethylene, for example each approximately 10%. The material mixture may further comprise a mineral filler of magnesium-di-hydroxide with a synergist of zinc borate. In particular, the flame-retardant system may be comprised of 62% of magnesium-di-hydroxide with 4% zinc borate synergist. The material mixture of the second sheath layer 220 may further include a polymer-filler coupling of vinyl-tri-methoxy-silane (VTMS).

The intumescent-acting material may have an oxygen index of between 28 to 40% determined according to ASTM D-2863 test method, and a vertical flame rating (1/16" thick specimens) of V-0 according to UL-94 test method. The mineral filler may have a specific gravity of between 1.4 to 1.8 determined according to test method ASTM D-792, an oxygen index (LOI) of between 35 to 55% determined according to test method ASTM D-2863, and a vertical flame rating (1/16" thick specimens) of V-0 determined according to test method UL-94.

According to the embodiment of the optical fiber cable shown in FIG. 1, the cable core 100 may comprise a plurality of the at least one optical transmission element 110 and a strength member 120. Each of the optical transmission elements 110 includes a plurality of optical fibers 111. The optical transmission elements 110 further comprise a respective buffer tube 112 which surrounds the plurality of the optical fibers 111. The optical transmission elements 110 are placed around the strength member 120. The strength member, may be configured as a dielectric strength member, for example an up-jacketed glass-reinforced composite rod. In other embodiments, the strength member 120 may be, or may include, a steel rod, a stranded steel, tensile yarn or fibers, for example bundled aramid, or other strengthening materials.

The optical transmission elements 110 may be stranded around the strength member 120 in a pattern of stranding including reversals in lay direction of the optical transmission elements. The optical transmission elements 110 may be stranded in a repeating reverse-oscillatory pattern, such as so-called SZ stranding or other stranding patterns, for example helical. In other contemplated embodiments, the optical transmission elements 110 may be non-stranded. The optical transmission elements are bound together around the strength member 120 by a film or binder 300.

Figure 2:
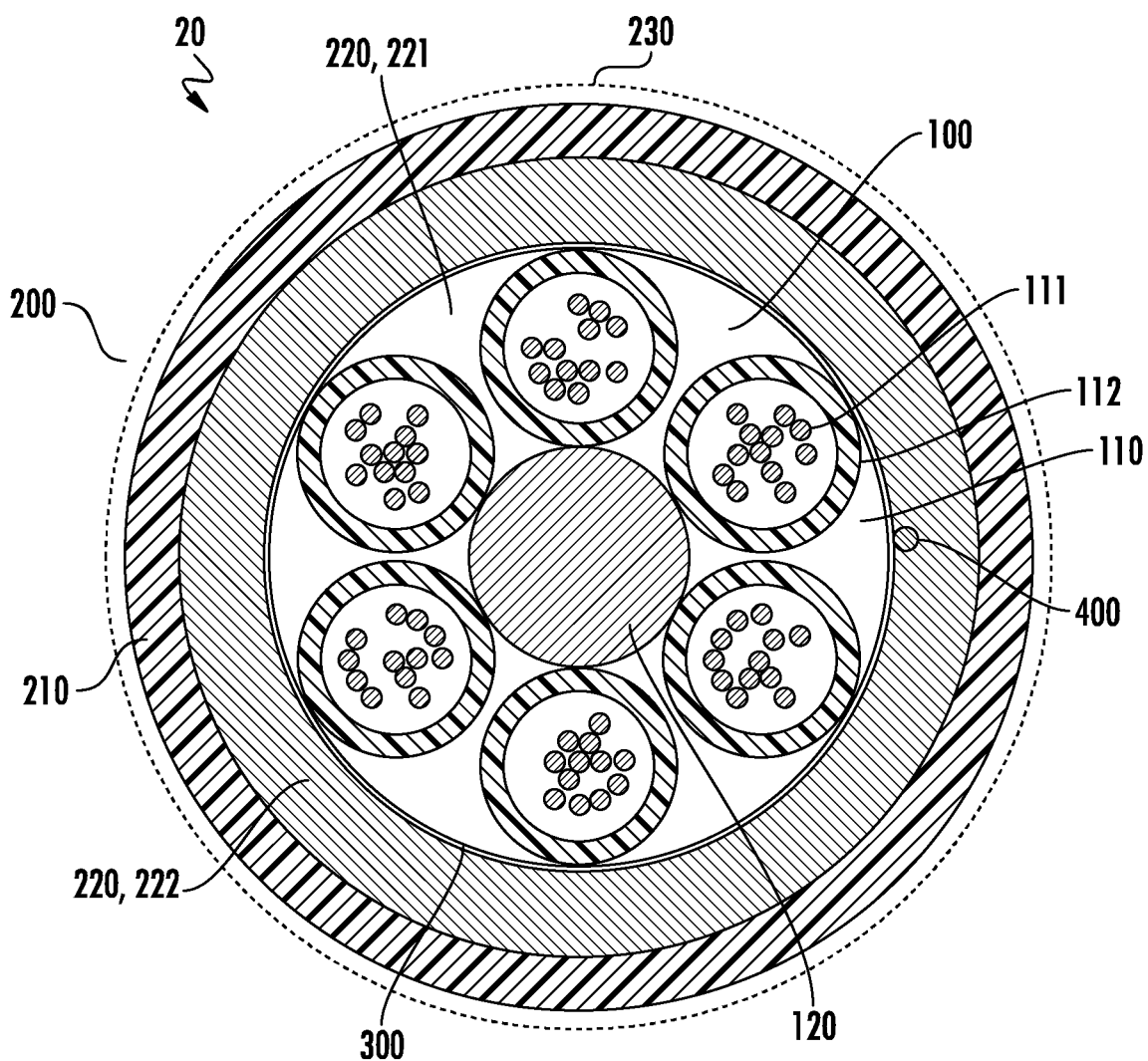
FIG. 2 shows a second embodiment of an optical fiber cable with a multilayered jacket comprising three layers.

FIG. 2 shows another embodiment of an optical fiber cable 20 comprising a cable core 100 including optical transmission elements 110, and a cable jacket 200 surrounding the cable core 100. The cable jacket 200 is embodied as the multilayered structure having the first sheath layer 210 and the at least one second sheath layer 220. The cable may optionally comprise the layer 230. Regarding the material composition and the properties of the first sheath layer 210 and the optional layer 230, reference is made to the explanations of FIG. 1.

The at least one second sheath layer 220 comprises a bedding layer 221 and an intermediate layer 222. The intermediate layer 222 is comparable with the at least one second sheath layer 220, as described with reference to FIG. 1. Regarding the properties and material composition of the intermediate layer 222, reference is made to the description of the at least one second sheath layer 220 of FIG. 1. In comparison to the embodiment of the optical fiber cable 10 shown in FIG. 1, the cable jacket 200 of the optical fiber cable 20 additionally comprises the bedding layer 221. The bedding layer 221 may comprise a polymer based resin including a mineral filler. The bedding layer 221 I placed in gaps 130 between the optical transmission elements 110.

The polymer based resin may be configured as a mixture of polyolefins and polyolefin based copolymers. The polyolefins may include low-density polyethylene (LDPE) or linear low density polyethylene (LLDPE). The polyolefin based copolymer may include ethylene-vinyl acetate (EVA) or ethylene butylacetate (EBA) or ethylene methacrylic acid (EMA) or octane branched polyolefins or butane branched polyolefins or ethylene vinyl acetate copolymer (EVM) or ethylene propylene diene monomer rubber (EPDM) or ethylene propylene rubber (EPR). Regarding the bedding layer 221 soft polymers like EVM or EPDM or EPR are the preferred materials.

The mineral filler of the bedding layer 221 may be configured as a system based on a metal hydrate filler like aluminum-tri-hydroxide (ATH) or magnesium-di-hydroxide (MDH). The material of the bedding compound 230 may include the metal hydrate filler, for example aluminum-tri-hydroxide (ATH) or magnesium-di-hydroxide (MDH). The bedding compound 230 may be configured as a higher filled material than the second sheath layer 220. According to a possible embodiment of the optical fiber cable 20, a loading of the mineral filler in the bedding compound 230 is between 60 and 85 wt %. Regarding the bedding layer 221, very soft polymers like above-mentioned EVM or EPDM or EPR in combination with very high amount of the filler material are preferred.

Figure 3:
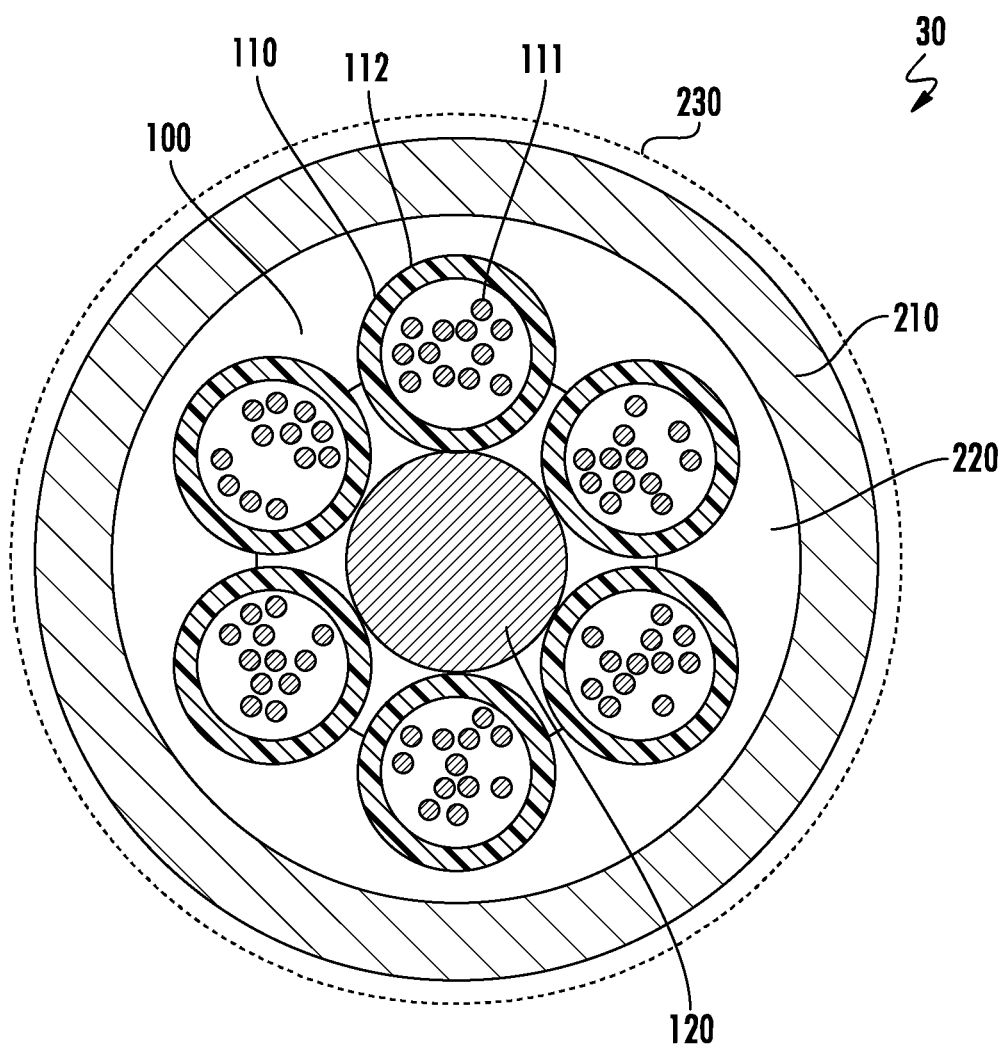
FIG. 3 shows a third embodiment of an optical fiber cable with a multilayered (bi-layered) structure of a cable jacket including a bedding layer.

FIG. 3 shows an embodiment of an optical fiber cable 30 comprising the first sheath layer 210 and the at least one second sheath layer 220. The fiber cable may optionally comprise the layer 230. Regarding the material composition and properties of the first sheath layer 210 and the optional layer 230, reference is made to the description of the first sheath layer 210 of the embodiment of the optical fiber cable 10 shown in FIG. 1.

In contrast to the embodiment of the optical fiber cable 10 of FIG. 1, the at least one second sheath layer 220 is configured as a bedding layer. The plurality of the optical transmission elements 110 is embedded in the bedding layer. The bedding layer is placed in gaps 130 between the plurality of the at least one optical transmission element 110. As illustrated in FIG. 3, the bedding layer may also have a portion being arranged above the optical transmission elements 110, i.e. above the buffer tubes 112. Regarding the composition and properties of the at least one second layer 220, reference is made to the description of the bedding layer 221 of the embodiment of the optical fiber cable 20 shown in FIG. 2.

Figure 4:
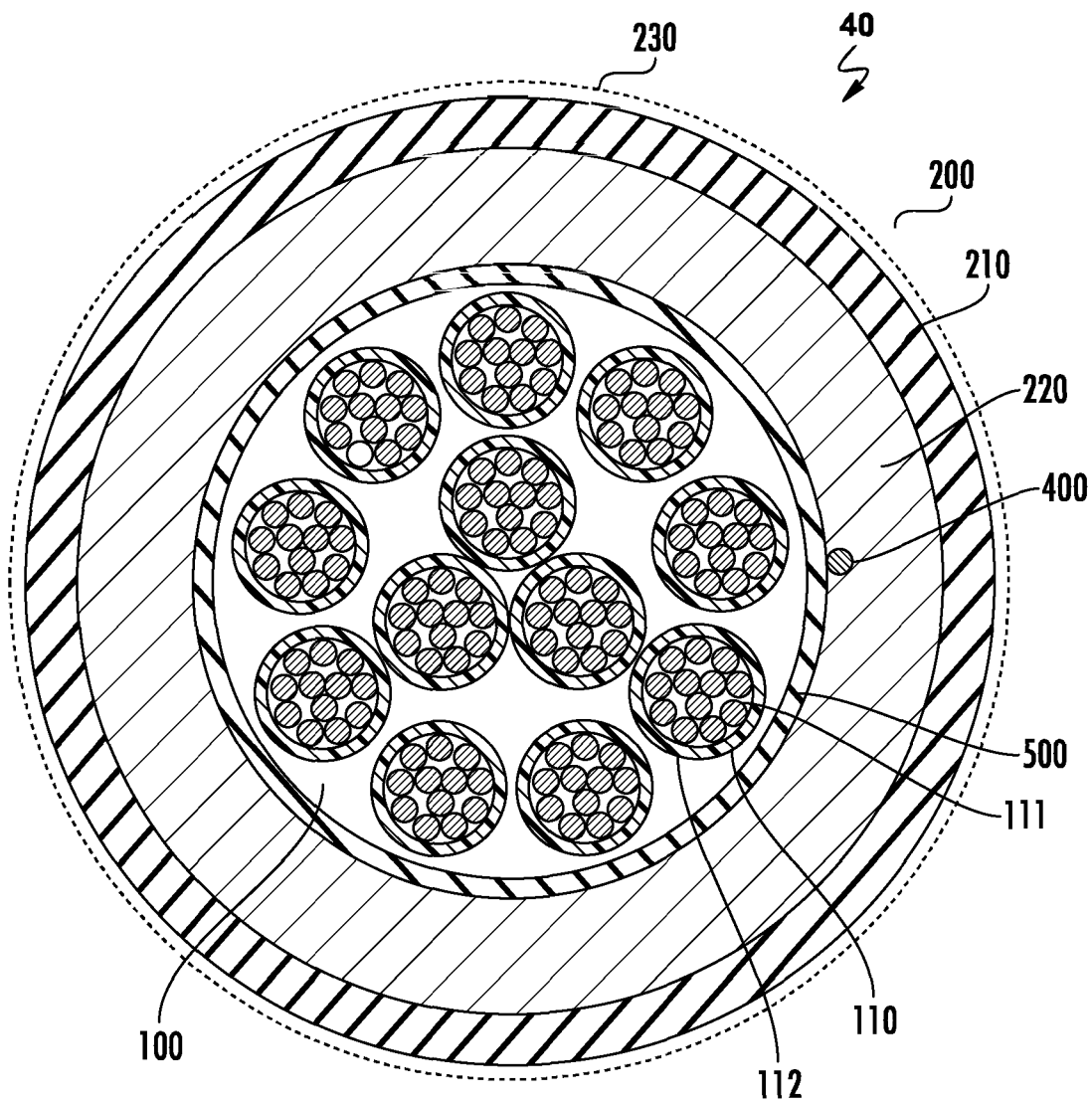
FIG. 4 shows a fourth embodiment of an optical fiber cable including a cable core with tight buffered optical fibers and a multilayered (bi-layered) structure of a cable jacket.
Figure 5:
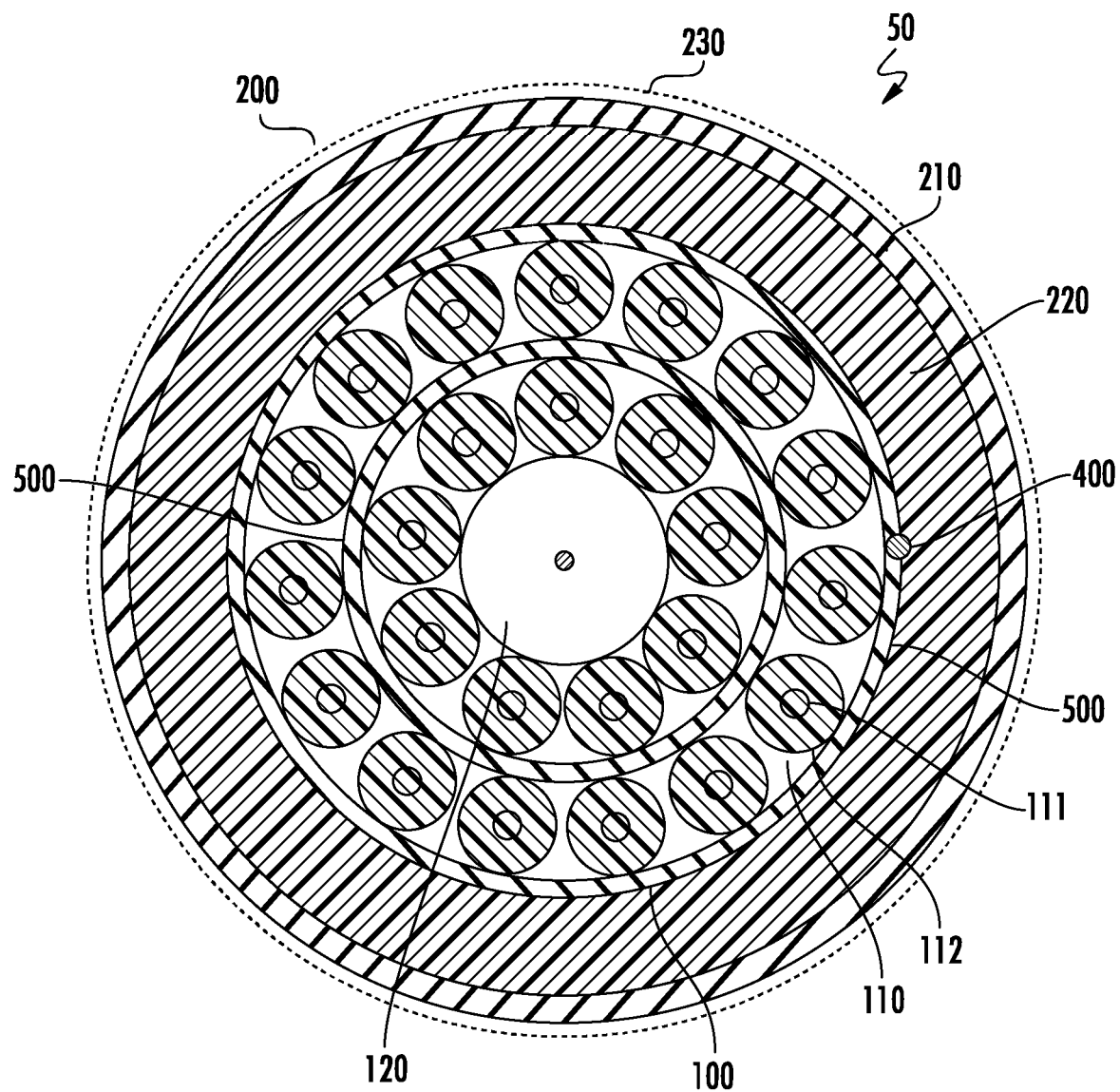
FIG. 5 shows a fifth embodiment of an optical fiber cable including a cable core with tight buffered optical fibers and a multilayered (bi-layered) structure of a cable jacket.

The embodiments of the optical fiber cables 10, 20 and 30 comprise respective optical transmission elements 110 being configured as buffered optical fibers, i.e. the optical fibers 111 are surrounded by a buffer tube 112, and the optical fibers 111 are loosely arranged within the buffer tubes 112. FIGS. 4 and 5 show different embodiments of an optical fiber cable 40 and 50, wherein the optical transmission elements 110 are configured as tight buffered optical fibers. The optical fiber cables 40 and 50 may preferably be used as indoor optical cables.

FIG. 4 shows an embodiment of an optical fiber cable 40 comprising a plurality of optical transmission elements 110 being arranged in a cable core 100 of the optical fiber cable 40. The optical transmission elements 110 are configured as tight buffered optical fibers. Each of the optical transmission elements comprises a plurality of optical fibers 111 being surrounded by a respective buffer tube 112. The cable core 100 and the optical transmission elements 110 are surrounded by a reinforcing element 500 which may be configured as an aramid yarn. The cable core 100 is further surrounded by a cable jacket 200 being embodied as the multi-layered structure. The multilayered structure of the cable jacket 200 comprises the first sheath 210 and the at least one second sheath layer 220. The cable jacket 200 may optionally comprise the layer 230 to facilitate a blowing-in process of the optical fiber cable in an empty duct. Regarding the composition and properties of the first sheath layer 210 and the at least one second sheath layer 220 and the optical layer 230, reference is made to the description of the optical fiber cable 10 of FIG. 1.

FIG. 5 shows another embodiment of an optical fiber cable 50 having a cable core 100 including optical transmission elements being configured as tight buffered optical fibers. The optical transmission elements/tight buffered optical fibers 110 respectively include an optical fiber 111 being surrounded by the buffer tube 112. The cable core 100 may comprise a first and at least a second layer of the optical transmission elements 110. According to the embodiment of the optical fiber cable 50, a first, inner layer of optical transmission elements 110 is arranged around the strength member 120, and a second, outer layer of the optical transmission elements 110 is arranged around the first inner layer of the optical transmission elements. The inner and the outer layer of the optical transmission elements 110 may be separated by a reinforcing element 500. Another reinforcing element 500 may be arranged around the outer layer of the optical transmission elements 110 to separate the cable jacket 200 from the cable core 100. The cable jacket 200 which surrounds the cable core 100 comprises the multilayered structure having the first sheath layer 210 and the at least one second sheath layer 220. The cable jacket 200 may optionally comprise the low-friction layer 230 to facilitate a blowing-in process of the optical fiber cable in an empty conduit. Regarding the material composition and properties of the first sheath layer 210 and the at least one second sheath layer 220 and the optional layer 230, reference is made to the description of the optical fiber cable 10 of FIG. 1.

In order to prove the feasibility and effectiveness of the described approach to improve the materials' and cables' fire protection performances, low smoke halogen-free commercially available materials, having different kinds of flame retardant action mode, were selected. Among the selected materials are intumescent options like Halguard series 59002 and mineral-filled materials like Halguard 58140, both from Teknor Apex. Halguard 58140 has a specific gravity of 1.60, an oxygen index of 42%, and a vertical flame rating V-0 (1/16" thick specimens). Halguard 59002 is a polypropylene-copolymer based material including an intumescent system and may be used for the first, outer sheath layer 210. Halguard 58140 may be used for the second sheath layer 220.

Figure 6:
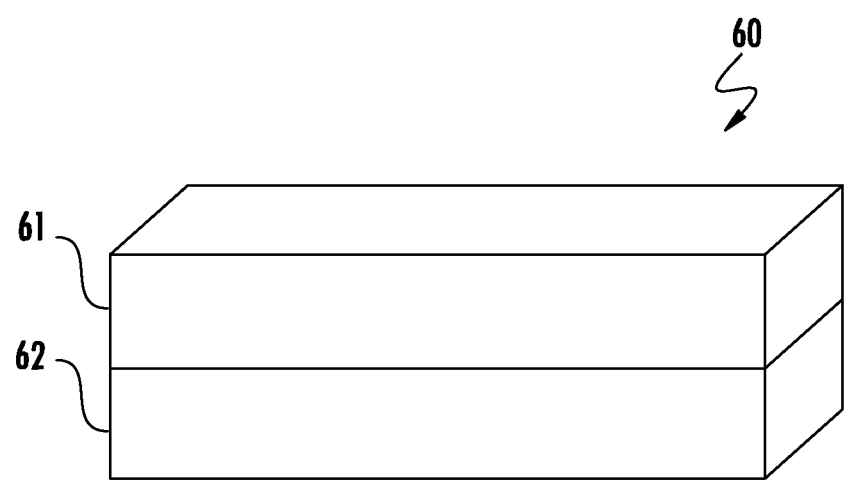
FIG. 6 shows a sample of two layers of material used for testing the fire behavior of a multilayered structure of a cable jacket.

In the following a preliminary feasibility test for assessment of the fire protection performance of a multilayered structure based on Halguard 58140 and Halguard 59002 is described. The tested multilayered structure 60 shown in FIG. 6 comprises a first layer 61 made of Halguard 59002 representing the first sheath layer 210, and a second layer 62 made of Halguard 58140 representing the second sheath layer 220.

In order to manufacture the stacked multilayered structure 60 the single materials of Halguard 59002 and Halguard 58140 were first pressed separately at a defined thickness and then hot-pressed together to achieve a total thickness of 3 mm. The hot-pressing process was conducted for each layer separately, with a thickness based on the aimed design. Pressing was performed in a uniaxial heated press with plate temperatures of 170° C. The compounds of Halguard 59002 and Halguard 58140 in pellet shape were placed in a tooling frame with a certain thickness between the plates and molten at low pressure to release all potential volatiles.

After 15 minutes the pressure was increased to a higher load for five minutes. Each of the two samples based on Halguard 59002 and Halguard 58140 were then cooled between water-cooled copper plates and taken off the frame. The first layer 61 and the second layer 62 were stacked in a frame with a height of 3 mm and pressed at 150° C. for 15 minutes to create the multilayer sample design 60 shown in FIG. 6. After cooling, a final sample size of 100×100×3 mm was achieved by die-cutting the 100×100 mm size.

The fire behavior of the multilayered structure was tested under forced flame conditions according to cone calorimeter measurements (ISO 5660) by using square specimens (100 mm×100 mm×3 mm) horizontally fixed on a sample holder. The irradiation used was 50 kWm-2. When exposed to elevated temperature, each single layer 61 and 62 in the multilayered structure 60 started burning separately, first the layer 61 on the top, i.e. the surface directly exposed to the cone heater, and later the layer 62 underneath. In the case of an intumescent layer on the top, which may serve as a sacrificial layer, the material started foaming and expanding its volume during the combustion process. Only once the first layer 210 was completely combusted and converted to black char did the second layer 220 undergo ignition and start the combustion process as well. At the end of the fire test, the original multilayered structure can still be identified in the fire residue.

Among the several tested multilayered configurations, according to cone calorimeter measurements, the multilayer structures of Halguard 59002:Halguard 58140 (1.5:2.5) mm (i.e. the layer 61 of Halguard 59002 having a thickness of 1.5 mm and the layer 62 of Halguard 58140 having a thickness of 2.5 mm) and Halguard 59002:Halguard 58140 (1.0:2.0) mm (i.e. the layer 61 of Halguard 59002 having a thickness of 1.0 mm and the layer 62 of Halguard 58140 having a thickness of 2.0 mm) and Halguard 58140:Halguard 59002 (1.5:1.5) mm (i.e. both of the layer 61 of Halguard 59002 and the layer 62 of Halguard 58140 having a thickness of 1.5 mm) show better fire properties than the pure single materials. In particular, compared to the single materials alone (i.e. Halguard 59002 and Halguard 58140, separately tested by cone calorimeter with a total plaque thickness of 3 mm), the three mentioned multilayered structures exhibited better heat release performances.

The shape of the respective heat release curves for the multilayered structures shows a clear double peak behaviour which indicates that each single layer 61 and 62, 210 and 220 respectively, burns almost separately. Once the most exposed layer 61 or 210 is consumed, the underlying layer 62 or 220 ignites and starts burning.

That results overall in a longer/slower burner process that may have impact when applying these multilayered structures as jacket material in a real cable design. The proposed multilayered structure for the cable jacket hence enables to delay and slow down the cable combustion, delaying the fire and heat from reaching the cable core.

The proposed multi-layered structures for a cable jacket 200 of an optical fiber cable show better fire protection performances compared to pure separate materials and to blended materials. A multilayered structure of a cable jacket improves the fire performance of a fiber optical cable as well as when tested according to the European standard EN 50399, when applied as a jacket material.

The multilayered structure of the cable jacket 200 may be applied to several cable designs including optical fiber cables for indoor and outdoor applications, optical fiber cables with loose arrangement of optical fibers in buffer tubes as well as tight buffered optical fibers. The use of the proposed multilayered cable jacket is not restricted to the cable designs shown in FIGS. 1 to 5 and rather may be used to improve the flame retardant performance of a plurality of other optical fiber cable designs.

What is claimed is:

1. An optical fiber cable with improved fire protection performance, comprising:
    a cable core including at least one optical transmission element to transfer light;
    a cable jacket surrounding the cable core, wherein the cable jacket comprises a multilayered structure having a first sheath layer and at least a second sheath layer being surrounded by the first sheath layer,
    wherein the first sheath layer includes a first flame retardant additive that includes an intumescent-acting material with a density of the intumescent-acting material being lower than 1.2 g/cm$^3$, and wherein the second sheath layer includes a second flame retardant additive that includes a mineral filler such that the second flame retardant additive has a density of above 1.3 g/cm$^3$.

2. The optical fiber cable of claim 1, wherein the first sheath layer includes a mixture of a polymer based resin and a polymer-filler coupling system and processing additives and the first flame retardant additive.

3. The optical fiber cable of claim 1, wherein the material of the at least one second sheath layer includes a mixture of a polymer based resin and a polymer-filler coupling system and processing additives and the second flame retardant additive.

4. The optical fiber cable of claim 1, wherein the intumescent-acting material includes a phosphorus-nitrogen combination or ammonium polyphosphate or intumescent graphite or triazine or combinations thereof, and wherein the mineral filler includes a metal hydrate and/or metal hydroxide and/or metal oxide hydroxide and/or combinations thereof.

5. The optical fiber cable of claim 1, wherein the intumescent-acting material and/or the mineral filler includes at least one synergist.

6. The optical fiber cable of claim 1, wherein the polymer based resin is configured as a mixture of polyolefins and polyolefin based copolymers.

7. The optical fiber cable of claim 6, wherein the polyolefins include low-density polyethylene or linear low-density polyethylene, and wherein the polyolefin based copolymer includes ethylene-vinyl acetate or ethylene butylacetate or ethylene methacrylic acid or octane branched polyolefins or butane branched polyolefins.

8. The optical fiber cable of claim 1, wherein a material mixture of the first sheath layer includes a polypropylene-copolymer based material and the intumescent-acting material, and wherein a material mixture of the second sheath layer includes a polymer combination of equal ratios of ethylene-vinyl acetate and octane branched Linear low-density polyethylene and low-density polyethylene, and the mineral filler is Magnesium-Di-Hydroxide with a synergist of zinc borate, and a polymer-filler coupling of vinyl-tri-methoxy-silane.

9. The optical fiber cable of claim 1, wherein the cable core comprises a plurality of the at least one optical transmission element and a strength member, wherein each of the optical transmission elements includes a plurality of optical fibers surrounded by a buffer tube, wherein the optical transmission elements are placed around the strength member, wherein the cable jacket includes a bedding compound, and wherein the bedding compound is placed in gaps between the optical transmission elements.

10. The optical fiber cable of claim 9, wherein the bedding compound includes a mineral filler.

11. The optical fiber cable of claim 10, wherein a loading of the mineral filler in the second sheath layer is between 40 and 65 wt %, and wherein a loading of the mineral filler in the bedding compound is between 60 and 85 wt %.

\* \* \* \* \*